United States Patent [19]

Johnson

[11] 3,873,947

[45] Mar. 25, 1975

[54] MULTIPLE FREQUENCY FLEXURE-MODE RESONATOR

[75] Inventor: Robert A. Johnson, Tustin, Calif.

[73] Assignee: Rockwell International Corporation

[22] Filed: Apr. 22, 1974

[21] Appl. No.: 462,849

[52] U.S. Cl. .................... 333/72, 310/8.2, 310/8.5, 310/9.8, 333/71

[51] Int. Cl. .......................... H03h 9/26, H01v 7/00

[58] Field of Search .............. 333/71, 72, 30; 310/8, 310/8.1, 8.2, 8.3, 8.4, 8.5, 8.6, 9.1, 9.4, 9.3, 9.8

[56] References Cited

UNITED STATES PATENTS 3,576,453 4/1971 Mason ................................ 310/8.2

*Primary Examiner*—James W. Lawrence
*Assistant Examiner*—Marvin Nussbaum
*Attorney, Agent, or Firm*—Howard R. Greenberg

[57] ABSTRACT

A flexure-mode resonator employs a plurality of switchable piezoelectric transducers which can be shorted out individually or in combination to provide multiple operating frequencies.

6 Claims, 1 Drawing Figure

PATENTED MAR 25 1975
3,873,947
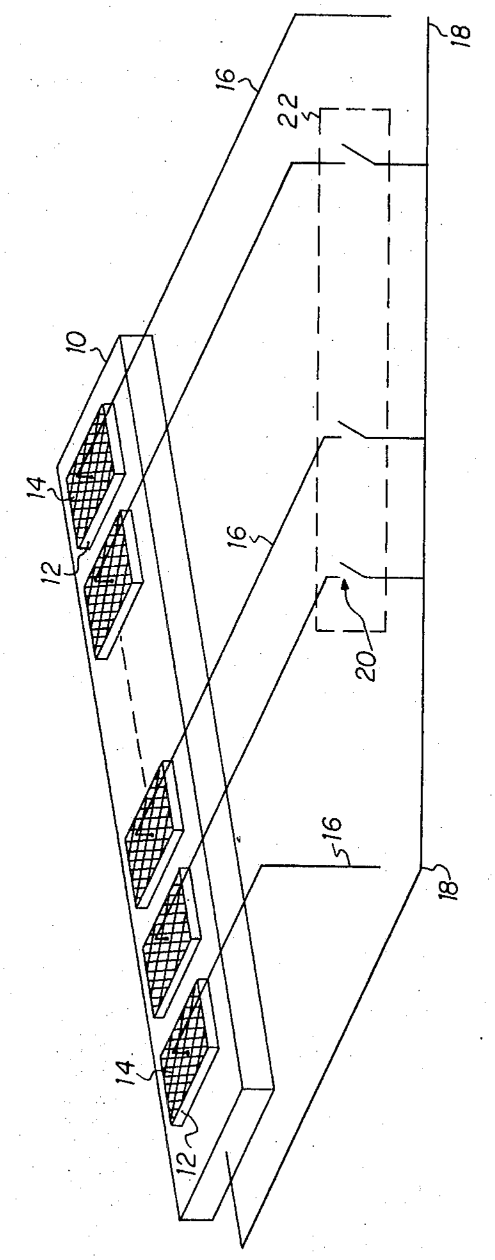

MULTIPLE FREQUENCY FLEXURE-MODE RESONATOR

BACKGROUND OF THE INVENTION

The present invention pertains to mechanical resonators generally and specifically to a class known as flexure-mode resonators whose operation is dependent on the well known piezoelectric effect.

The piezoelectric effect for converting mechanical or electrical energy from one form to the other has been put to advantageous use in mechanical resonators through piezoelectric transducers. For example, in one type of mechanical resonator, commonly referred to as flexure-mode, which is discussed in a technical paper entitled "Mechanical Filters — A Review of Progress" by R. A. Johnson, et al., appearing in the *IEEE Transactions on Sonics and Ultrasonics*, Vol. SU-18, No. 3, July 1971, a single piezoelectric transducer consisting of a slab of ceramic or crystal material is affixed to the surface of a metal bar which is free to flex in a direction perpendicular to the plane of the transducer's major surface. The major surfaces of the piezoelectric material are metallically coated. Consequently, when the bar is allowed to mechanically vibrate in an unrestrained mode, the electric field generated in the piezoelectric transducer produces an electric field across the electrode pair (top and bottom electrode surfaces) whose frequency corresponds to the mechanical resonant frequency of the composite transducer-bar combination. Alternatively, an electric signal can be applied to the electrode pair in order to produce bar movement along the axis perpendicular to the plane of the transducer, with maximum motion occurring when the electric signal frequency corresponds to the mechanical resonant frequency. No matter how the flexure-mode resonator just described is used, it is effective only near the electric signal frequency corresponding to its mechanical resonant frequency. This severely hampers its usefulness and versatility, despite the precision frequency which it can provide, because of the need, and of course associated cost, to combine it with other devices in order to convert its single operating frequency to other frequencies when the environment in which it is used requires different operating frequencies.

With the foregoing in mind, it is a primary object of the present invention to provide a new and improved flexure-mode resonator which displays more than one mechanical resonant frequency.

It is a further object of the present invention to provide such a new and improved flexure-mode resonator whereby the mechanical resonant frequency is easily altered.

These objects are accomplished by the use of a metal bar having affixed thereto a plurality of piezoelectric transducers each having a separate electrode pair so that the transducers can be selectively shorted out either individually or in combination through a switching means which connects the metal bar electrode termination to the electrode terminations of those transducers which are to be shorted cut. Each shorted out transducer reduces the mechanical resonant frequency of the resonator by a predetermined amount. The invention may be best understood by referring to the detailed description which follows hereinafter together with the appended drawing which presents an isometric view of the preferred embodiment of the flexure-mode resonator.

DETAILED DESCRIPTION OF THE INVENTION

As shown in the attached drawing, the flexure-mode resonator of the invention comprises a metal bar 10 to which is affixed along its longitudinal axis plurality of piezoelectric transducers 12 (being affixed through any common bonding technique, such as soldering). The exposed metallically coated electrode surfaces 14 are connected to individual electrode terminations shown herein as metal wires 16. The metallic coating is designed to provide a uniformly distributed electric field throughout the piezoelectric transducers 12. In this connection, it should be noted that the piezoelectric transducers 12 could be formed just as well from a single piece of piezoelectric material so long as the electrodes 14 are separated by a wide enough gap so as to prevent the electric field of one transducer from coupling too greatly to that of an adjacent transducer.

An electric signal is either applied to or derived from a piezoelectric transducer 12 through the electrode termination 16 connected thereto and a common electrode termination 18 which is connected to the metal bar 10. The electric signal passes between the common electrode termination 18 and a transducer 12 via its underside which is in electrical contact with the metal bar 10. The underside, which may or may not be metallically coated dependent on the bonding technique, and the exposed metallically coated surface area 14 constitute an electrode pair for the electric field through the associated transducer. In a two-port device such as the one depicted in the appended drawing, an electric field would be produced in the piezoelectric transducer 12 furthermost to the left by applying an input signal between electrode termination 18 and electrode termination 16 connected thereto, thereby causing it and the metal bar 10 to which it is affixed to vibrate in a direction perpendicular to the major surface of the bar. An output signal would be produced between electrode termination 18 and the electrode termination 16 connected to the piezoelectric transducer 12 furthermost to the right (because of the electric field produced in the transducer by the bar flexing action) whose magnitude would be dependent on the frequency of the input signal with respect to the mechanical resonant frequency of the resonator. Any two transducers 12 may be selected for connection to input and output circuits respectively. The resonator could also be used in a one-port mode wherein only one transducer 12 is utilized for connection to external circuitry.

The electrodes 14 of the piezoelectric transducers 12 between the end transducers are connected to the electrode termination 18 through individual switches 20 of a switching means 22. The switches 20 can be closed individually or in any combination under the control of the switching means 22, both of which may be implemented mechanically or electrically, as desired, in any one of numerous well known ways. Consequently, one or more piezoelectric transducers 12 can be shorted simultaneously by closing the associated switches 20. As is known, the shorting of a single piezoelectric transducer 12 causes the resonant frequency $f$ of a single transducer resonator to decrease by an amount $\Delta f$ which is defined by the known formula: $\Delta f = (k^2 f/2)$, where $k$ is equal to the electromechanical coupling coefficient as measured with respect to the piezoelectric transducer 12 to be shorted. Since $\Delta f$ is very small with respect to $f$ (generally in the order of 1% or less) it makes no difference effectively whether $f$ corresponds to the open or shorted condition of the electrode pair for calculation purposes.

With regard to the present invention, the $\Delta f$ reduction in frequency produced by a shorted transducer 12 in the presence of other transducers 12 is essentially unchanged irrespective of how many other transducers 12 are open or shorted so that once $\Delta f$ is individually determined for each piezoelectric transducer 12 comprising the resonator, its effect in reducing the overall resonant frequency when shorted may be simply superimposed on the effects produced by other shorted transducers. Consequently, in addition to the resonant frequency observed with all piezoelectric transducers 12 open, there are other different resonant frequencies possible dependent on the characteristics of the switchable transducers and the combinations in which they are shorted out. With the three switchable transducers 12 shown in the attached drawing, there are four different resonant frequencies possible if they all have the same $k$ value or seven different resonant frequencies if they all have a different $k$ value. More resonant frequencies may be provided simply by providing additional piezoelectric transducers as represented symbolically by the dashed line between two of the transducers 12 in the drawing.

It is to be noted that the electromechanical coupling coefficient $k$ which determines $\Delta f$ for each piezoelectric transducer 12 is a complex function of the physical dimensions of the transducer as well as to a lesser degree the location of the transducer with respect to the metal bar 10. Although a strictly mathematical approach using extremely complex equations requiring solution through the use of a computer have been developed to aid in the design of flexure-mode resonators, it will be readily apparent to those skilled in the art that once a particular bar size has been selected, for example, to meet space requirements, as well as the number of piezoelectric transducers 12 to provide the desired number of operating frequencies, the proper dimensions and distribution of the piezoelectric transducers 12 relative to the bar can be easily and accurately determined through a trial and error process. As mentioned earlier, the switching means 22 and individual switches 20 can be either mechanical or electrical as desired in accordance with design requirements.

It is thus seen that the invention disclosed herein modifies flexure-mode resonators so as to facilely provide multiple frequencies, thereby greatly increasing their use and versatility. Since modifications to the embodiment described herein readily apparent to those skilled in the art may be made without departing from the scope and spirit of the invention, the embodiment should be considered exemplary and not restrictive of the invention as claimed hereinbelow.

What is claimed is:

1. A multiple frequency flexure-mode resonator comprising: a metal bar having an electrode termination connected thereto, a plurality of piezoelectric transducers affixed to said bar along its length with each transducer having a metallically coated surface area with an electrode termination connected thereto and means for selectively shorting out said transducers individually or in combination by connecting the metal bar electrode termination to the electrode terminations of the transducers to be shorted out.

2. The resonator of claim 1 wherein said transducers are formed from a single piece of piezoelectric material and the separation between the metallically coated surface areas thereof is sufficient to essentially avoid electrical coupling between adjacent transducers.

3. The resonator of claim 1 wherein said bar has a rectangular shape.

4. The resonator of claim 1 wherein its resonant frequency is reduced by an amount $\Delta f$ for each transducer which is shorted out and $\Delta f$ equals $k^2f/2$, where $f$ equals the resonant frequency of the resonator and $k$ equals the electromechanical coupling coefficient for the transducer which is to be shorted out.

5. The resonator of claim 1 wherein one of said transducers is provided solely for connection to an external circuit.

6. The resonator of claim 1 wherein two of said transducers are provided solely for connection to external input and output circuits respectively.

* * * * *